US009450966B2

(12) United States Patent
Forrester et al.

(10) Patent No.: US 9,450,966 B2
(45) Date of Patent: Sep. 20, 2016

(54) METHOD AND APPARATUS FOR LIFECYCLE INTEGRITY VERIFICATION OF VIRTUAL MACHINES

(75) Inventors: Ronald James Forrester, Portland, OR (US); William Wyatt Starnes, Portland, OR (US); Frank A. Tycksen, Jr., Beaverton, OR (US)

(73) Assignee: KIP Sign P1 LP, New York, NY (US)

( * ) Notice: Subject to any disclaimer, the term of this patent is extended or adjusted under 35 U.S.C. 154(b) by 1424 days.

(21) Appl. No.: 12/179,303

(22) Filed: Jul. 24, 2008

(65) Prior Publication Data

US 2009/0089860 A1   Apr. 2, 2009
US 2012/0291094 A9   Nov. 15, 2012

Related U.S. Application Data

(63) Continuation-in-part of application No. 11/608,742, filed on Dec. 8, 2006, now Pat. No. 8,266,676, which is a continuation-in-part of application No. 11/832,781, filed on Aug. 2, 2007, now Pat. No.

(Continued)

(51) Int. Cl.
H04L 9/32 (2006.01)
H04L 29/06 (2006.01)
H04L 9/08 (2006.01)

(52) U.S. Cl.
CPC ............ *H04L 63/12* (2013.01); *H04L 9/0897* (2013.01); *H04L 9/3236* (2013.01); *H04L 63/1433* (2013.01)

(58) Field of Classification Search
None
See application file for complete search history.

(56) References Cited

U.S. PATENT DOCUMENTS

| 5,465,299 A | 11/1995 | Matsumoto et al. |
| 5,535,276 A | 7/1996 | Ganesan |
| 5,919,257 A | 7/1999 | Trostle |
| 6,157,721 A | 12/2000 | Shear et al. |
| 6,209,091 B1 | 3/2001 | Sudia et al. |
| 6,289,460 B1 | 9/2001 | Hajmiragha |
| 6,327,652 B1 | 12/2001 | England et al. |
| 6,330,670 B1 | 12/2001 | England et al. |

(Continued)

FOREIGN PATENT DOCUMENTS

| WO | 0048063 | 8/2000 |
| WO | 2006058313 | 6/2006 |

(Continued)

OTHER PUBLICATIONS

Liu et al., "A Dynamic Trust Model for Mobile Ad Hoc Networks", May 26, 2004, IEEE, Proceedings of the 10th IEEE International Workshop on Future Trends of Distributed Computing Systems (FTDCS'04), pp. 80-85.

*Primary Examiner* — Michael R Vaughan
(74) *Attorney, Agent, or Firm* — Baker & Hostetler LLP

(57) ABSTRACT

A method and system for verifying the integrity of virtual machines and for verifying the integrity of discrete elements of the virtual machines throughout the lifecycle of the virtual machines. A virtual machine manager capable of managing one or more virtual machine images is installed on a physical hardware platform. An integrity verification component can be communicatively coupled to the virtual machine manager and an integrity reference component so that the integrity verification component can compare digests of the virtual machine image or discrete virtual machine image elements to virtual machine integrity records accessible from the integrity reference component.

55 Claims, 7 Drawing Sheets

Related U.S. Application Data 7,487,358, which is a continuation of application No. 11/288,820, filed on Nov. 28, 2005, now Pat. No. 7,272,719.

(60) Provisional application No. 60/953,314, filed on Aug. 1, 2007, provisional application No. 60/749,368, filed on Dec. 9, 2005, provisional application No. 60/759,742, filed on Jan. 17, 2006, provisional application No. 60/631,449, filed on Nov. 29, 2004, provisional application No. 60/631,450, filed on Nov. 29, 2004, provisional application No. 60/637,066, filed on Dec. 17, 2004.

(56) References Cited

U.S. PATENT DOCUMENTS

| | | | |
|---|---|---|---|
| 6,393,420 B1 | 5/2002 | Peters | |
| 6,470,448 B1 | 10/2002 | Kuroda et al. | |
| 6,609,200 B2 | 8/2003 | Anderson et al. | |
| 6,823,454 B1 | 11/2004 | Hind et al. | |
| 6,826,690 B1 | 11/2004 | Hind et al. | |
| 6,922,782 B1* | 7/2005 | Spyker et al. | 713/161 |
| 6,950,522 B1 | 9/2005 | Mitchell et al. | |
| 6,976,087 B1 | 12/2005 | Westfall et al. | |
| 6,978,366 B1 | 12/2005 | Ignatchenko et al. | |
| 7,003,578 B2 | 2/2006 | Kanada et al. | |
| 7,024,548 B1 | 4/2006 | O'Toole, Jr. | |
| 7,100,046 B2 | 8/2006 | Balaz et al. | |
| 7,114,076 B2 | 9/2006 | Callaghan | |
| 7,178,030 B2 | 2/2007 | Scheidt et al. | |
| 7,188,230 B2* | 3/2007 | Osaki | 711/216 |
| 7,233,942 B2 | 6/2007 | Nye | |
| 7,268,906 B2 | 9/2007 | Ruhl et al. | |
| 7,272,719 B2 | 9/2007 | Bleckmann et al. | |
| 7,310,817 B2* | 12/2007 | Hinchliffe et al. | 726/24 |
| 7,350,204 B2* | 3/2008 | Lambert et al. | 717/172 |
| 7,383,433 B2 | 6/2008 | Yeager et al. | |
| 7,457,951 B1 | 11/2008 | Proudler et al. | |
| 7,461,249 B1 | 12/2008 | Pearson et al. | |
| 7,574,600 B2 | 8/2009 | Smith | |
| 7,581,103 B2* | 8/2009 | Home et al. | 713/176 |
| 7,689,676 B2* | 3/2010 | Vinberg et al. | 709/220 |
| 7,733,804 B2* | 6/2010 | Hardjono et al. | 370/254 |
| 7,774,824 B2* | 8/2010 | Ross | 726/2 |
| 7,793,355 B2* | 9/2010 | Little et al. | 726/34 |
| 7,844,828 B2* | 11/2010 | Giraud et al. | 713/187 |
| 7,877,613 B2* | 1/2011 | Luo | 713/187 |
| 7,904,727 B2* | 3/2011 | Bleckmann et al. | 713/176 |
| 7,987,495 B2* | 7/2011 | Maler et al. | 726/1 |
| 8,010,973 B2* | 8/2011 | Shetty | 719/330 |
| 8,108,856 B2* | 1/2012 | Sahita et al. | 718/1 |
| 2002/0069129 A1 | 6/2002 | Akutsu et al. | |
| 2002/0095589 A1 | 7/2002 | Keech | |
| 2002/0144149 A1 | 10/2002 | Hanna et al. | |
| 2002/0150241 A1 | 10/2002 | Scheidt et al. | |
| 2003/0014755 A1 | 1/2003 | Williams | |
| 2003/0028585 A1 | 2/2003 | Yeager et al. | |
| 2003/0030680 A1 | 2/2003 | Cofta et al. | |
| 2003/0097581 A1 | 5/2003 | Zimmer | |
| 2003/0115453 A1* | 6/2003 | Grawrock | G06F 21/57 713/155 |
| 2003/0177394 A1 | 9/2003 | Dozortsev | |
| 2004/0107363 A1 | 6/2004 | Monteverde | |
| 2004/0172544 A1* | 9/2004 | Luo et al. | 713/189 |
| 2004/0181665 A1 | 9/2004 | Houser | |
| 2004/0205340 A1 | 10/2004 | Shimbo et al. | |
| 2005/0021968 A1* | 1/2005 | Zimmer et al. | 713/176 |
| 2005/0033987 A1 | 2/2005 | Yan et al. | |
| 2005/0048961 A1 | 3/2005 | Ribaudo et al. | |
| 2005/0114687 A1* | 5/2005 | Zimmer et al. | 713/193 |
| 2005/0132122 A1* | 6/2005 | Rozas | 711/100 |
| 2005/0138417 A1 | 6/2005 | McNerney et al. | |
| 2005/0163317 A1 | 7/2005 | Angelo et al. | |
| 2005/0184576 A1 | 8/2005 | Gray et al. | |
| 2005/0257073 A1 | 11/2005 | Bade et al. | |
| 2005/0278775 A1* | 12/2005 | Ross | 726/2 |
| 2006/0005254 A1* | 1/2006 | Ross | 726/27 |
| 2006/0015722 A1 | 1/2006 | Rowan et al. | |
| 2006/0048228 A1* | 3/2006 | Takemori et al. | 726/22 |
| 2006/0074600 A1 | 4/2006 | Sastry et al. | |
| 2006/0117184 A1* | 6/2006 | Bleckmann | H04L 9/3247 713/176 |
| 2006/0173788 A1 | 8/2006 | Nath Pandya et al. | |
| 2007/0016888 A1* | 1/2007 | Webb | 717/106 |
| 2007/0050622 A1 | 3/2007 | Rager et al. | |
| 2007/0130566 A1 | 6/2007 | vanRietschote et al. | |
| 2007/0143629 A1 | 6/2007 | Hardjono et al. | |
| 2007/0174429 A1 | 7/2007 | Mazzaferri et al. | |
| 2007/0180495 A1* | 8/2007 | Hardjono et al. | 726/3 |
| 2007/0204153 A1* | 8/2007 | Tome | H04L 63/0272 713/164 |
| 2007/0260738 A1* | 11/2007 | Palekar | G06F 21/577 709/229 |
| 2008/0092235 A1 | 4/2008 | Comlekoglu | |
| 2008/0126779 A1* | 5/2008 | Smith | 713/2 |
| 2008/0189702 A1* | 8/2008 | Morgan et al. | 718/100 |
| 2008/0256363 A1 | 10/2008 | Balacheff et al. | |
| 2009/0089860 A1 | 4/2009 | Forrester et al. | |
| 2011/0179477 A1* | 7/2011 | Starnes | G06F 21/52 726/9 |
| 2011/0320816 A1* | 12/2011 | Yao et al. | 713/171 |
| 2012/0023568 A1* | 1/2012 | Cha et al. | 726/10 |
| 2015/0033038 A1* | 1/2015 | Goss | G06F 12/1408 713/193 |

FOREIGN PATENT DOCUMENTS

| | | |
|---|---|---|
| WO | 2006058313 A2 | 6/2006 |
| WO | WO2008/024135 A3 | 2/2008 |
| WO | WO/2008/030629 A1 | 3/2008 |
| WO | WO/2009/018366 A1 | 2/2009 |

* cited by examiner

METHOD AND APPARATUS FOR LIFECYCLE INTEGRITY VERIFICATION OF VIRTUAL MACHINES

RELATED APPLICATION DATA

This application claims the benefit of commonly-assigned U.S. Provisional Patent Application Ser. No. 60/953,314, titled "ARCHITECTURE, METHOD AND APPARATUS FOR THE LIFECYCLE INTEGRITY VERIFICATION OF VIRTUAL MACHINES, THEIR SPECIFIED CONFIGURATIONS, AND THEIR DISCRETE ELEMENTS", filed Aug. 1, 2007, which is hereby incorporated by reference.

This application is a continuation-in-part of commonly-assigned U.S. patent application Ser. No. 11/608,742, titled "METHOD TO VERIFY THE INTEGRITY OF COMPONENTS ON A TRUSTED PLATFORM USING INTEGRITY DATABASE SERVICES", filed Dec. 8, 2006, now U.S. Pat. No. 8,266,676, issued Sep. 11, 2012, which claims the benefit of commonly-assigned U.S. Provisional Patent Application Ser. No. 60/749,368, titled "METHOD TO VERIFY THE INTEGRITY OF COMPONENTS ON A TRUSTED PLATFORM USING INTEGRITY DATABASE SERVICES", filed Dec. 9, 2005, and commonly-assigned U.S. Provisional Patent Application Ser. No. 60/759,742, titled "METHOD AND APPARATUS FOR IP NETWORK ACCESS CONTROL BASED ON PLATFORM COMPONENT SIGNATURES AND TRUST SCORES," filed Jan. 17, 2006, which are hereby incorporated by reference.

This application is a continuation-in-part of commonly-assigned U.S. patent application Ser. No. 11/832,781, titled "METHOD TO CONTROL ACCESS BETWEEN NETWORK ENDPOINTS BASED ON TRUST SCORES CALCULATED FROM INFORMATION SYSTEM COMPONENT ANALYSIS", filed Aug. 2, 2007, now U.S. Pat. No. 7,487,358, issued Feb. 3, 2009, which is a continuation of commonly-assigned U.S. patent application Ser. No. 11/288,820, titled "METHOD TO CONTROL ACCESS BETWEEN NETWORK ENDPOINTS BASED ON TRUST SCORES CALCULATED FROM INFORMATION SYSTEM COMPONENT ANALYSIS", filed Nov. 28, 2005, now U.S. Pat. No. 7,272,719, issued Sep. 18, 2007, which claims the benefit of commonly-assigned U.S. Provisional Patent Application Ser. No. 60/631,449, titled "METHOD TO HARVEST, SUBMIT, PERSIST, AND VALIDATE DATA MEASUREMENTS EMPLOYING WEB SERVICES", filed Nov. 29, 2004, commonly-assigned U.S. Provisional Patent Application Ser. No. 60/631,450, titled "METHOD TO VERIFY SYSTEM STATE AND VALIDATE INFORMATION SYSTEM COMPONENTS BY MEANS OF WEB SERVICES USING A DATABASE OF CRYPTOGRAPHIC HASH VALUES", filed Nov. 29, 2004, and commonly-assigned U.S. Provisional Patent Application Ser. No. 60/637,066, titled "METHOD TO CONTROL ACCESS BETWEEN NETWORK ENDPOINTS BASED ON TRUST SCORES CALCULATED FROM INFORMATION SYSTEM COMPONENTS", filed Dec. 17, 2004, which are hereby incorporated by reference.

This application is related to commonly-assigned U.S. patent application Ser. No. 11/422,146, titled "SYSTEM AND METHOD TO REGISTER A DOCUMENT WITH A VERSION MANAGEMENT SYSTEM", filed Jun. 5, 2006, which claims the benefit of commonly-assigned U.S. Provisional Patent Application Ser. No. 60/688,035, titled "METHOD TO CERTIFY AND REGISTER INSTANCES OF AN ELECTRONIC DOCUMENT WITH A CENTRALIZED DATABASE ENABLING TRACKING AND ATTESTATION TO THE AUTHENTICITY AND ACCURACY OF COPIES OF THE REGISTERED DOCUMENT", filed Jun. 7, 2005, and commonly-assigned U.S. patent application Ser. No. 11/624,001, titled "METHOD AND APPARATUS TO ESTABLISH ROUTES BASED ON THE TRUST SCORES OF ROUTERS WITHIN AN IP ROUTING DOMAIN", filed Jan. 17, 2007, now U.S. Pat. No. 7,733,804, issued Jun. 8, 2010, which claims the benefit of commonly-assigned U.S. Provisional Patent Application Ser. No. 60/824,740, titled "METHOD AND APPARATUS TO ESTABLISH ROUTES BASED ON THE TRUST SCORES OF ROUTERS WITHIN AN IP ROUTING DOMAIN", and commonly-assigned U.S. patent application Ser. No. 11/422,151, titled "SYSTEM AND METHOD TO MANAGE A DOCUMENT WITH A VERSION MANAGEMENT", filed Jun. 5, 2006, and commonly-assigned U.S. patent application Ser. No. 11/776,498, titled "METHOD AND SYSTEM TO ISSUE TRUST SCORE CERTIFICATES FOR NETWORKED DEVICES USING A TRUST SCORING SERVICE", filed Jul. 11, 2007, which claims the benefit of commonly-assigned U.S. Provisional Patent Application Ser. No. 60/807,180, titled "METHOD AND APPARATUS TO ISSUE TRUST SCORE CERTIFICATES FOR NETWORKED DEVICES USING A TRUST SCORING SERVICE", filed Jul. 12, 2006, all of which are hereby incorporated by reference.

FIELD OF THE INVENTION

This application pertains to computer virtualization, and more particularly, to determining the integrity of one or more virtual machines and their associated components.

BACKGROUND OF THE INVENTION

Businesses are making tremendous investments in computer hardware and data centers. Meanwhile, the costs associated with powering and cooling the data centers are steadily increasing. To make matters worse, data center real estate is at a premium while demand relentlessly expands for more computer hardware to produce the sheer processing power necessary to meet the complex and growing needs of the businesses. Juxtaposing the need for more computer hardware and larger data centers is a troubling statistic that on average only 8-12% of the processing power of any given machine used in a data center is active, while the processors remain essentially idle the rest of the time.

For example, large batch processing machines used by banks are configured to run large batches of reconciliations. But when a machine is not performing the batches of reconciliations, it may in essence be "wasting" processing power until another batch of reconciliations begins, or until the machine is removed or powered off for maintenance. The wasted processing power results in bloated information technology budgets and an overall increase of costs to the businesses.

Virtualization of computer resources is changing the face of computing by offering a way to make use of the idling machines to a higher degree. Virtualization is a broad term that refers to the abstraction of computer resources. In other words, physical characteristics of computing resources may be hidden from the way in which other systems, applications, or end users interact with those resources. The most basic use of virtualization involves reducing the number of servers by increasing the utilization levels of a smaller set of machines. This includes making a single physical resource such as a server or storage device appear to function as one or more logical resources. Additionally, it can make one or more physical resources appear as a single resource. For instance, if a server's average utilization is only 15%, deployment of multiple virtual machines onto that server has the potential to increase the overall utilization by a factor of 5 or more. Thus, not only is the usage of each machine more efficiently managed, but the usability of the system as a whole is also enhanced.

While the virtualization of computer resources promises to deliver many benefits, there are worrisome problems that lurk beneath the surface of this new and exciting computing trend. A virtual machine may be a single instance of a number of discrete identical execution environments on a single computer, each of which runs an operating system (OS). These virtual machines act as individual computing environments and therefore are subject to many of the same operating deficiencies found in standard physical computing environments. The virtual machines can be configured improperly, often by well-intentioned technicians or operators, and then broadly deployed. Operating systems, applications, and configurations can be modified from the expected state, thereby creating a drift between the expected and actual machine configuration.

Additionally, the lifecycle of a virtual machine can vary widely depending upon the specific operation that it was provisioned and intended for. No longer must a physical server be dedicated to running a monthly task (such as billings and reconciliations). A virtual machine can be provisioned with the same OS, applications, and configurations and placed into physical storage until it is ready to execute. Once copied to a physical machine, it can be executed, perform its monthly cycle functions, and then be shutdown and returned to storage. In this way, virtual machines may be used much like physical servers are today, but may operate less frequently, e.g., running for just hours or minutes at a time rather than months or years, as was often the case with a physical server. As a result, no longer are the auditors, technicians, or other operators able to sit down at a specific physical server that is dedicated to a specific task or group of transactions. Instead, virtual resources of an entire data center are used to perform the transactions. It is therefore difficult to know which physical server ran which transaction, what its state was, whether correct software was being used, whether correct controls were in place, whether they were compliant with regulatory environments, and so forth.

Another problem that threatens the viability of the virtualization movement is that of access control, security, and data integrity. Whereas before, gaining access to a data center most often required interaction with physical servers, buildings, and people, in a virtualized environment, such safe guards are lessened. For example, before virtualization, adding a physical server to a data center involved somebody swiping an access card or other security measure to allow access to the data center, carrying a box into the data center under the supervision of other IT professionals or building managers, and installing the physical server into a rack. With the advent of virtualization, theoretically a person can sit in a remote location and install a new server into the virtualized environment without ever needing to physically access the data center. Thus, the ability to control the data center environment is diminished. And while malicious activity accounts for only about 3-5% of data center issues, most of the data center issues are caused by well-intentioned people who are either inadequately trained or make honest mistakes, thereby leading to system or component failures, which can sometimes be very severe—even catastrophic.

Accordingly, a need remains for a way to identify and authenticate the integrity of virtual machines and their components. The present application addresses these and other problems associated with the prior art.

SUMMARY OF THE INVENTION

The present application includes a method and system for verifying the integrity of virtual machines and for verifying the integrity of discrete elements of the virtual machines throughout the lifecycle of the virtual machines. The system can include a machine, a virtual machine manager capable of managing one or more virtual machine images installed on the machine, an integrity reference component configured to store a plurality of virtual machine integrity records, and an integrity verification component communicatively coupled to the virtual machine manager and the integrity reference component, the integrity verification component configured to compare a digest of said one or more virtual machine images to a digest of at least one of said plurality of virtual machine integrity records accessible from the integrity reference component.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
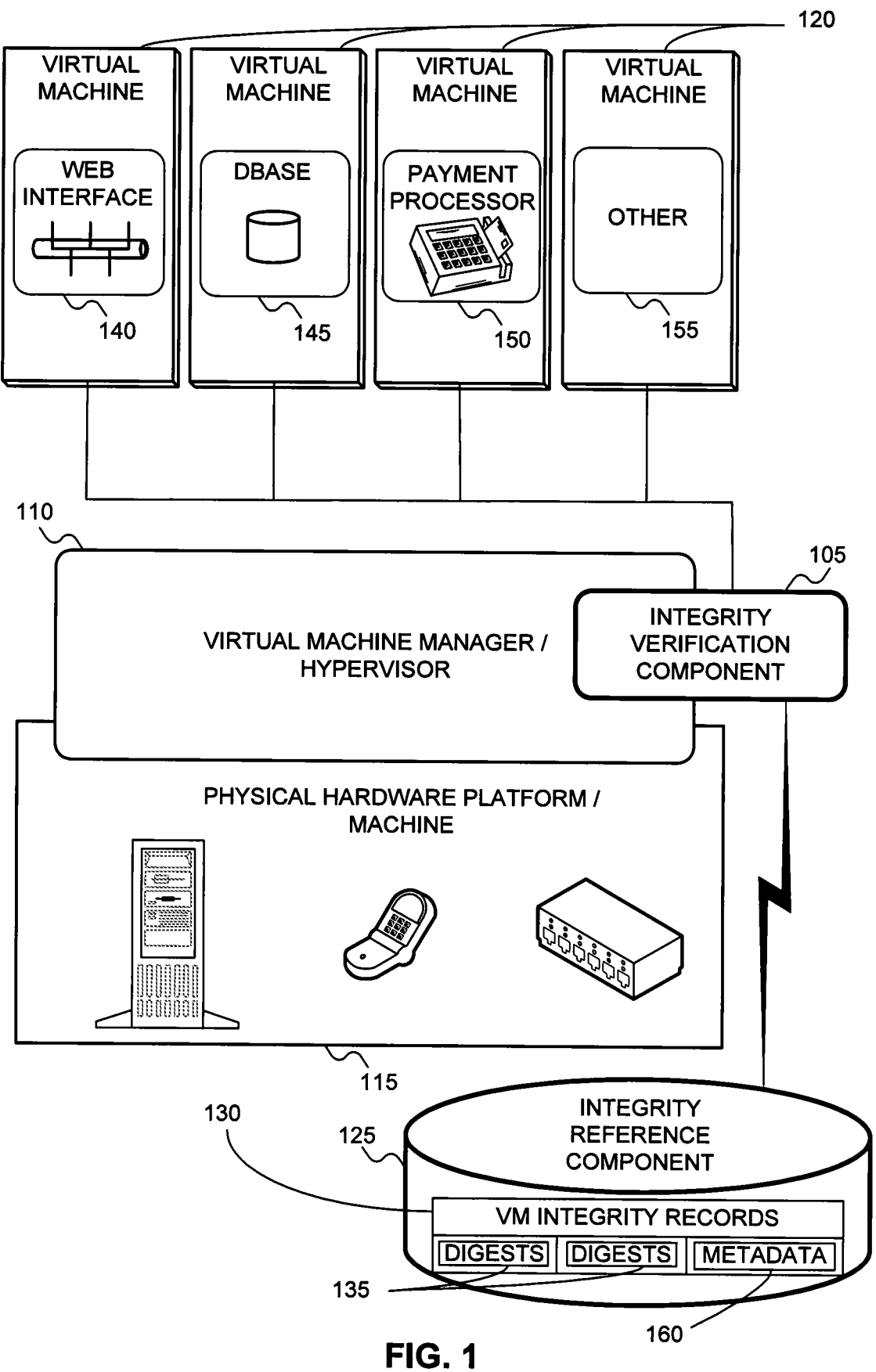
FIG. 1 shows a system including a virtual machine environment, an integrity verification component, and an integrity reference component according to an embodiment of the present invention.

To solve the problems in the prior art, an embodiment of the invention begins by setting forth a method and system for verifying the integrity of virtual machines in a virtual machine environment. A basic use of virtualization involves reducing the number of physical machines or servers by increasing the utilization levels of a smaller set of physical machines or servers. Virtualization enables administrators to perform this consolidation by treating each physical machine as one or more virtual machines. As a result, there are fewer physical machines to support, which use less rack space and result in reduced power consumption. In addition, virtualization provides an opportunity for administrators to homogenize the physical machine hardware platforms while still running disparate operating systems and applications, including legacy operating systems and applications that might not be usable on more current hardware platforms without a virtualization layer. Further, existing physical machine hardware can be repurposed without modifying the underlying hardware platforms. Virtualization also provides for simpler disaster recovery protection of data because enterprise systems required for business continuity can be deployed into any data center built on virtualized resources, regardless of whether the physical machine hardware platforms are identical.

A virtual machine manager (VMM), also referred to as a "Hyperviser," executes above the physical machine hardware and can provide the base functionality for accessing devices and memory of the physical machine. The VMM is also responsible for loading and controlling virtual machines, also referred to as virtual machine images. The VMM can control the virtual machines' access to system resources, and can schedule execution cycles in the processor. The VMM can ensure that each virtual machine is sufficiently isolated so that a failure in any one of the virtual machines will not affect the ability of any other virtual machine to execute and continue operation.

A virtual machine image normally appears as a single file, or related set of files, on a normal underlying file system. The structure of the virtual machine image is such that internally it can represent a full file system for a given platform. Each virtual machine image can be dedicated to a particular task such as operating a web interface, a database, or a payment processor, among other possibilities. In other words, logical functions of a business can be separated into virtual machines and executed separately. For example, consider an e-commerce storefront that serves up many different pages of a catalog and controls a shopping cart that users can add items to. Unless the users were actually to purchase an item, a payment processor virtual machine would remain mostly idle, consuming little to no execution resources. Once a consumer decided to purchase the items in the shopping cart, then the payment processor virtual machine can be given execution cycles by the VMM and can process the transaction. Other examples include virtual machines used for bank or financial institution reconciliations, aircraft control system operations, or weather tracking systems, among many other possibilities.

The lifecycle of a virtual machine image includes various states. For example, a virtual machine image can be created, started, suspended, stopped, migrated, or destroyed. One factor of concern in the execution of virtual machines is the quality of the image as it is loaded from storage into the execution environment. Conventionally, virtual machine images are loaded from a storage location (such as a hard disk drive, memory, USB peripheral, etc.), and executed directly by the VMM, which has no expectation or understanding of the quality (i.e., trustworthiness or integrity) of the virtual machine image or of its contents.

Since the virtual machine is loaded from the storage location, the virtual machine image may not be compliant with expected settings and configurations required for proper execution in a given environment. The virtual machine image itself could be corrupted or even maliciously augmented (perhaps by an insider). Since a virtual machine image can be stored as a complete execution-capable environment, it is feasible that another user or system could access the virtual machine, execute it, and change its state by adding software or modifying its configuration, and then replace it back in the original storage location. If such actions are preformed by authorized administrators making authorized changes, such changes would be acceptable. However, the opportunity for unauthorized or unexpected changes exists. As previously mentioned, most of the data center issues are caused by well-intentioned people who are either inadequately trained or make honest mistakes, thereby leading to system or component failures. In other words, changes can be made by both legitimate and illegitimate users. Thus, the original virtual machine image might not be in its original or pristine state.

According to some embodiments of the present invention, an integrity verification component can be communicatively coupled to the VMM or integrated within the VMM to perform a one-way cryptographic hashing function over the virtual machine image. The resulting hash, also referred to herein as a "digest," can be compared to virtual machine integrity records, which include known good reference values (i.e., known good digests) stored locally in an integrity reference component, or alternatively stored remotely in an integrity reference component accessible over a network. As a result, throughout the course of its lifecycle, the virtual machine image can be verified to be in an expected state for the given environment.

FIG. 1 shows a system including a virtual machine environment, an integrity verification component, and an integrity reference component according to an embodiment of the present invention. An integrity verification component 105 can be communicatively coupled to a virtual machine manager (VMM)/Hypervisor 110. VMM 110 executes above physical hardware platform/machine 115. Machine 115 can be any desired platform, including among other possibilities a stand-alone computer, a server, a personal digital assistant (PDA), a cellular telephone, and a Smartphone. VMM 110 is capable of managing one or more virtual machine images 120 installed on machine 115, and provides the base functionality for providing virtual machine images 120 with access to devices and memory of machine 115.

Integrity verification component 105 can also be communicatively coupled to integrity reference component 125, which can store virtual machine integrity records 130 having known good digests 135. Prior to deployment of a virtual machine image 120, integrity verification component 105 can verify the integrity of virtual machine image 120 and create a hash or digest of virtual machine image 120 while in a known good state so as to facilitate the creation of a trusted library of known good reference values, such as those stored as virtual machine integrity records 130 having digests 135 in the integrity reference component 125. Integrity verification component 105 can verify the integrity of a software stack used to create virtual machine images 120 prior to creation of virtual machine images 120. Integrity reference component 125, including virtual machine integrity records 130 and digests 135, can also be digitally signed by an integrity reference provider (not shown).

After deployment of virtual machine images 120, the integrity verification component 105 can be configured to collect measurements, such as a digest, from one or more of the virtual machine images 120 and compare the digest to a digest 135 of at least one of the virtual machine integrity records 130 accessible from integrity reference component 125. Alternatively, integrity verification component 105 can generate the digest based on measurements collected from virtual machine images 120, and compare the generated digest to a digest 135 of at least one of the virtual machine integrity records 130. Integrity verification component 105 can then generate a trust score for one or more of the virtual machine images 120 responsive to the comparison. The trust score can further be generated based on an authenticity score authenticating a source of the collected measurements. Authenticity is an extension of integrity whereby the contents of the integrity reference component 125 also contains an indicator (not shown) of the source of the information derived from the measurements and stored in the integrity reference component 125 (such as in the form of virtual machine integrity records 130), thereby attesting to the origin of the information. Once the trust score has been generated, a determination can be made whether to grant or deny the virtual machine images 120 access to a given virtualized environment based on the trust score.

A trust score is an indication of whether a computer system is trustworthy. Trust scores can be generated in many different ways. In one embodiment, the trust score is the ratio of the number of validated modules on the computer system to the total number of modules on the computer system (validated or not). In another embodiment, the trust score can be scaled to a number between 0 and 1000, where 0 represents a completely untrustworthy computer system, and 1000 represents a completely trustworthy computer system. In yet another embodiment, critical modules can be weighted more highly than other modules, so that a computer system with more validated critical modules can score more highly than a computer system with few validated critical modules, even if the second computer system has more total modules validated. (The definition of "critical" is not intended to refer to modules that are absolutely necessary as much as modules that are identified as important to the organization. Thus, one organization might consider the files relating to the operating system to be "critical", whereas another organization might consider modules that are custom developed internally (for whatever purpose) to be "critical".)

Integrity reference component 125 can be locally accessible or directly attached to the integrity verification component, as shown in FIG. 1. As explained below, integrity reference component 125 can also be accessible remotely over a network providing access to virtual machine integrity records 130.

While the physical hardware platform/machine 115 of FIG. 1 shows a server, a cell phone, and a network component, persons with skill in the art will recognize that other physical hardware platforms or machines can be used. Similarly, while virtual machines 120 of FIG. 1 show virtual machines that operate a web interface 140, database 145, and a payment processor 150, persons with skill in the art will recognize that virtual machines 120 may perform other 155 operations.

Integrity verification component 105 can be integrated within VMM 110. Alternatively, integrity verification component 105 can exist as a sub-process having security privileges at least as high as security privileges for VMM 110. In addition, integrity verification component 105 can exist as an integrated physical component of the physical hardware platform/machine 115.

Figure 2:
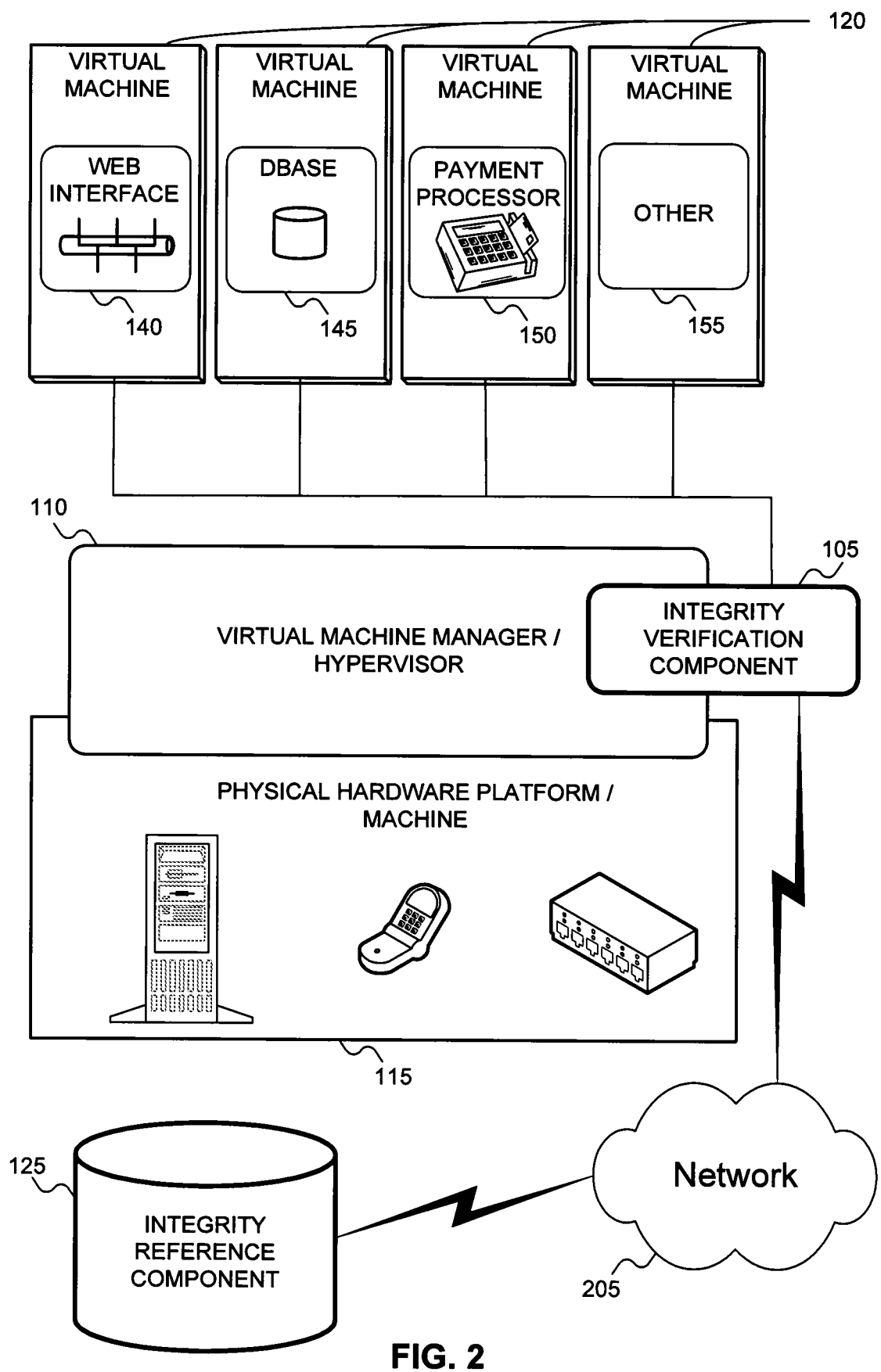
FIG. 2 shows a system including a virtual machine environment, a remotely accessible integrity verification component, and an integrity reference component according to another embodiment of the present invention.

FIG. 2 shows a system including a virtual machine environment, a remotely accessible integrity verification component, and an integrity reference component according to another embodiment of the present invention. As mentioned above, integrity reference component 125 can be remotely accessible using networking protocols over network 205. Integrity verification component 105 can perform a comparison of the measurements collected and/or generated from virtual machine images 120 against a global integrity reference component 125. Alternatively, as discussed with reference to FIG. 1 above, integrity verification component 105 can perform a comparison of the measurements collected and/or generated from virtual machine images 120 against a local integrity reference component 125. The integrity reference component 125, whether local or global, can periodically be updated with known-good virtual machine integrity records 130.

For advanced functions that would enhance performance, or for verifying smaller known sets of applications, a protected and secured version of integrity reference component 125 can be used as a known good manifest of acceptable measurements (not shown). The manifest can be stored locally to the enterprise (for example, on some other physical machine accessible from machine 115 via network 205), or on machine 115 itself. This manifest can be updated from the integrity reference component 125 as needed, when the integrity reference component is updated with additional virtual machine integrity records 130 and digests 135.

Figure 3:
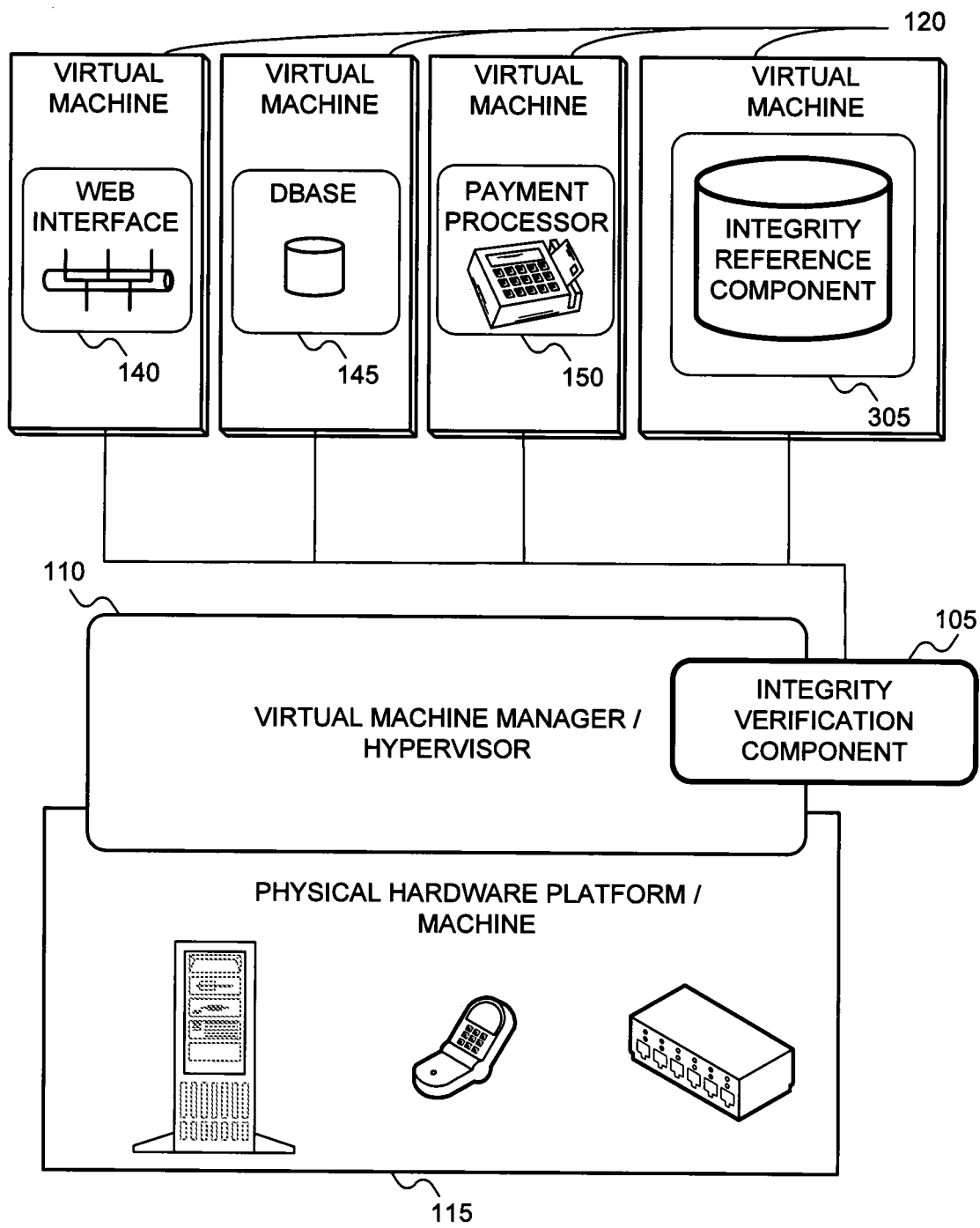
FIG. 3 shows a system including a virtual machine environment, an integrity verification component, and an integrity reference component operable within a virtual machine image according to another embodiment of the present invention.

FIG. 3 shows a system including a virtual machine environment, an integrity verification component, and an integrity reference component operable within a virtual machine image according to another embodiment of the present invention. In FIG. 3, integrity reference component 305 can be provided as a virtual machine image 120 itself. Rather than accessible as a separate database distinct from machine 115, integrity reference component 305 can be made available as a service installed on machine 115. Integrity reference component 305 can be periodically updated from a global integrity reference component accessible over a network (not shown). The description above with reference to capabilities of integrity reference component 125 can also apply to integrity reference component 305, and therefore such description will be omitted for the sake of brevity.

Figure 4:
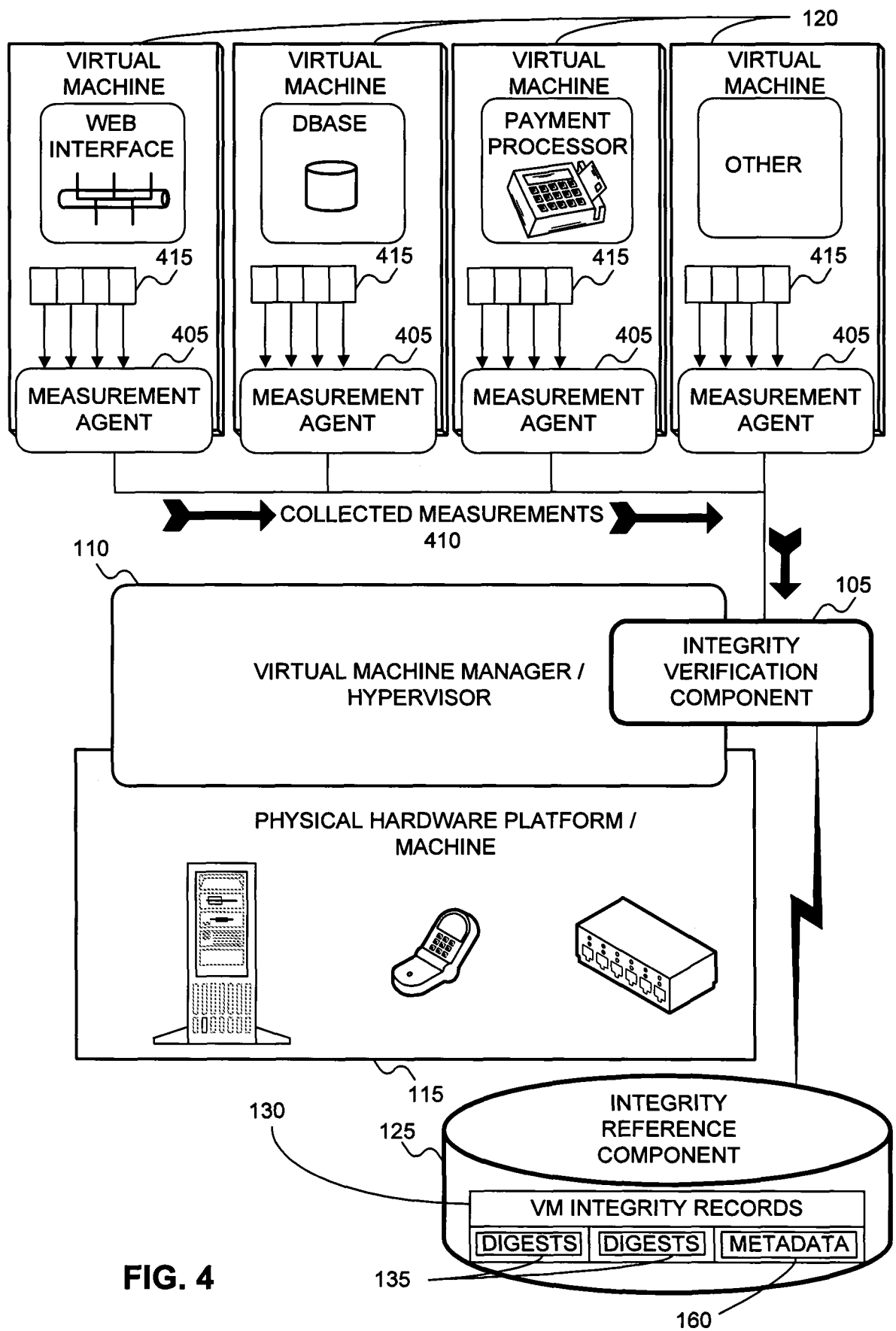
FIG. 4 shows a system including a virtual machine environment, measurement agents in communication with an integrity verification component, and an integrity reference component according to yet another embodiment of the present invention.

FIG. 4 shows a system including a virtual machine environment, measurement agents in communication with an integrity verification component, and an integrity reference component according to yet another embodiment of the present invention. Individual measurement agents 405 can collect measurements 410 of discrete virtual machine image elements 415 of virtual machine images 120. For example, discrete virtual machine image elements 415 can include operating system files, application files, or configuration files, among other possibilities. In one embodiment of the invention, measurement agents 405 can execute in each of the virtual machine images 120. In other words, measurement agents 405 are operable within each of the virtual machine images 120 and configured to collect measurements 410 of the discrete virtual machine image elements 415 corresponding to the virtual machine images 120. In another embodiment of the invention, measurement agents 405 can exist as integrated physical components of the physical hardware platform/machine 115. In this embodiment, there can be a single measurement agent 405 responsible for collecting measurements from all virtual machine images 120 operating on machine 115. Collected measurements 410 can include digests of discrete virtual machine image elements 415. Measurement agents 405 can be configured to transfer collected measurements 410 to integrity verification component 105.

It is not necessary to collect measurements 410 for every discrete virtual machine image element 415. Measurement agents 405 can be configured to collect measurements for only important discrete virtual machine image elements 415, however "important" is defined. For example, the important discrete virtual machine image elements 415 can include expected-to-be-static elements of virtual machine image 120 (on the premise that if the static elements change, the virtual machine has potentially been compromised), or the expected-to-be-dynamic elements of virtual machine image 120 (on the premise that the changing elements are the ones that might compromise the virtual machine).

Integrity verification component 105 can compare collected measurements 410 to at least one of the virtual machine integrity records 130 of integrity reference component 125. As previously discussed above, integrity verification component 105 can generate a trust score for one or more virtual machine images 120 responsive to a comparison of a hash or digest of a virtual machine image 120 itself to a digest 135 of a virtual machine integrity record 130 stored in the integrity reference component 125. Furthermore, integrity verification component 105 can generate a trust score for at least one of the discrete virtual machine image elements 415 of virtual machine images 120. The trust score can also be generated based on both the comparison of the digest of virtual machine image 120 itself, and on the comparison of digests of discrete virtual machine image elements 415 of virtual machine images 120 that can be collected using measurement agents 405. In both cases, integrity verification component 105 can generate the trust score using an authenticity score authenticating a source of collected measurements 410, as previously described above.

Integrity reference component 125 can also include metadata 160 to establish relationships between discrete virtual machine image elements 415. For example, metadata 160 can include version or vendor information of discrete virtual machine image elements 415, or other information indicating how the discrete virtual machine image elements relate to one another. Collected measurements 410 can also include metadata such as version or vendor information so that the collected measurements 410 can be compared to metadata 160 stored in integrity reference component 125, and can be used together with the digests 135 in determining the trust score for the virtual machine images 120.

In some embodiments of the present invention, metadata 160 can include a location of each virtual machine image 120 within the underlying file system of physical hardware platform/machine 115, or some other machine. If a virtual machine image 120 is expected to be located at a certain file path of the underlying file system, or at a certain location on a network drive, for example, metadata 160 can include such location information. Collected measurements 410 can also include metadata such as the location information so that the collected measurements 410 can be compared to metadata 160 stored in integrity reference component 125, and can be used together with the digests 135 in determining the trust score for the virtual machine images 120.

As another example, metadata 160 can include information regarding VMM 110 itself, such as whether VMM 110 comes from a pre-approved vendor list (not shown), and can be stored in integrity reference component 125 or included in collected measurements 410. The pre-approved vendor list can be created or maintained by a user or customer, or alternatively, the pre-approved vendor list can be created or maintained by a third party. In either case, the pre-approved vendor list can be stored in the integrity reference component 125 and used to help generate the trust score for the virtual machine images 120.

If the trust score is generated based on the important discrete virtual machine image elements 415 (e.g., the expected-to-be-static elements of virtual machine image 120), then the trust score likely remains the same during the lifecycle of virtual machine image 120 as it transitions from one state to another. However, if the important discrete virtual machine image elements 415 happen to change, then the trust score can be affected and might vary depending on the magnitude of the changes.

Figure 5:
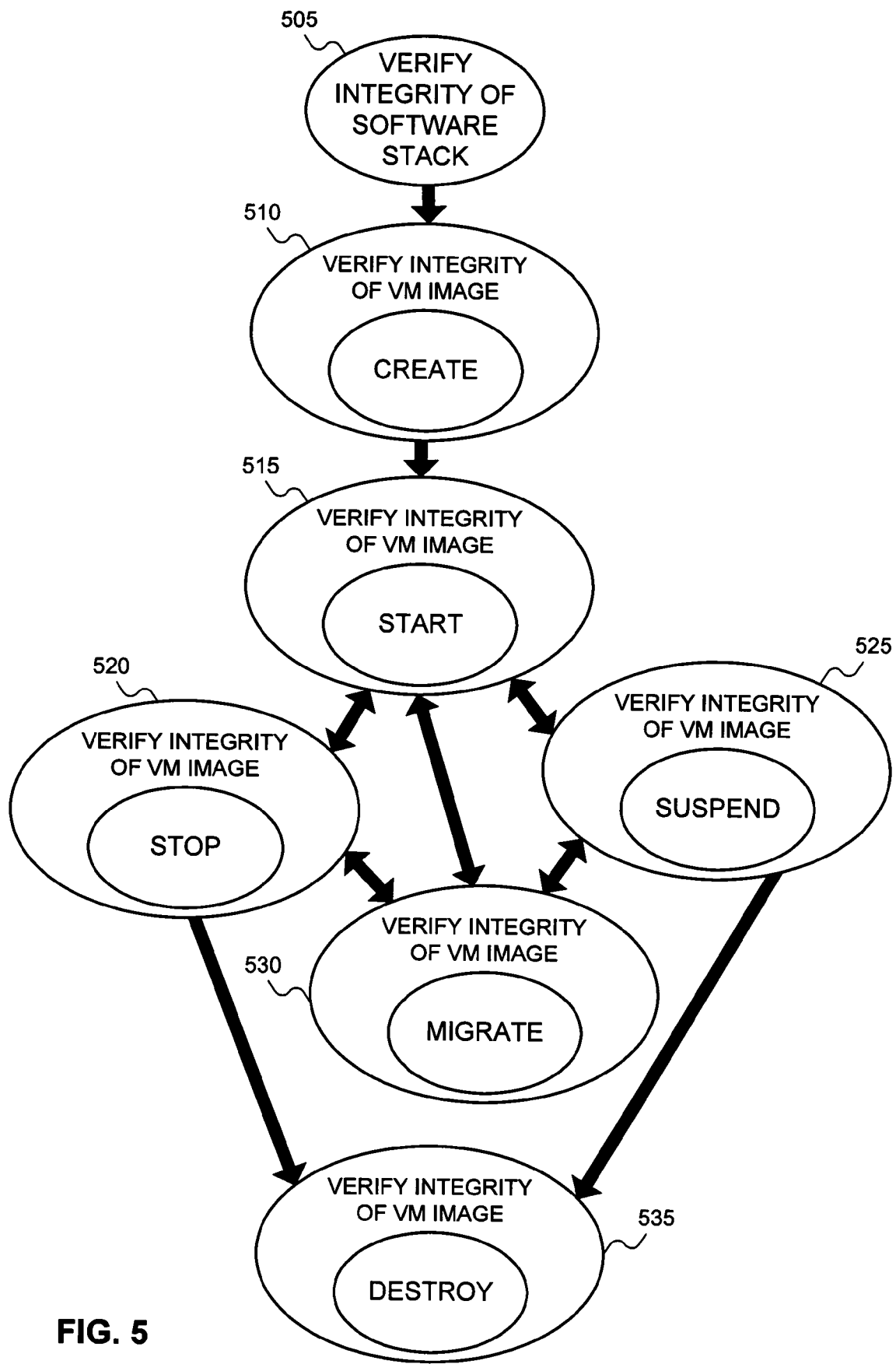
FIG. 5 shows a state diagram of a virtual machine lifecycle including verification actions performed during different states according to some embodiments of the present invention.

FIG. 5 shows a state diagram of a virtual machine lifecycle including verification actions performed during different states according to some embodiments of the present invention. In some cases, the virtual machine image might contain dynamic information or the stored virtual machine image that is loaded for execution by VMM 110 (of FIG. 1) can continually change or be expected to change. Or the virtual machine image can be loaded and executed for extended periods of time and eventually be migrated from one physical hardware platform to another. In other words, the virtual machine image can be in a different state each time it is retrieved from storage, and so the cryptographic hash or digest of the virtual machine image as stored can change over time. Thus, embodiments of the present invention provide integrity measurement and verification to guarantee the authenticity of the virtual machine image as it transitions through its lifecycle.

Prior to creation of the virtual machine image, the software stack used to create the virtual machine image can be verified as shown at state 505. The virtual machine image can then be created at state 510, and its integrity can be verified, as further discussed below. The virtual machine image can be created from a set of existing software such as an operating system or an application. Once the virtual machine image is created, it can be stored to await execution at a future time, or it can go directly into production where it is started at state 515. The virtual machine image can execute for some period of time such as minutes, days, or years before it transitions to one of three states: a stop state 520, a suspend state 525, or a migrate state 530.

In the stop state 520, the virtual machine image is stopped, no longer receiving cycles for execution, and is unloaded from memory. In the suspend state 525, the virtual machine image is temporarily suspended from execution and will no longer receive execution cycles until re-stared, but may remain in memory. Alternatively, the suspended virtual machine may be stored to disk (indefinitely) until it is restarted. In the migrate state 530, the virtual machine image can be migrated from on physical hardware platform to another. While this can be performed on a suspended virtual machine image, the migration can also occur with an active or started virtual machine image, thus resulting in a "hot" migration. The virtual machine image can also be destroyed, thereby removing its existence from execution and storage.

Traditionally, businesses take great care in provisioning non-virtualized physical hardware platforms to ensure that they are properly established before moving them into production. In virtualized environments, and with the ease of which the virtual machine images can be created, started, and migrated, greater care should be taken to ensure they are properly provisioned. In the create state 510, virtual machine images can be created from sets of software such as an operating system, an application, or a configuration file. Since the virtual machine images can be instantiated (created) at any time, on any number of platforms, the integrity of the software stack can be verified prior to the creation of the virtual machine images, as shown at state 505. The virtual machine image can then be created at the create state 510 responsive to verifying the integrity of the software stack. A digest of the virtual machine can be stored after creation, to support verification of the virtual machine at a later time, such as when the virtual machine is started (by comparing the digest with a digest of the virtual machine taken before it is started).

When the virtual machine image is started at state 515, the virtual machine image can be loaded from a previously stored virtual machine image, or it can be a re-start of a previously suspended in-memory virtual machine image. The integrity of the virtual machine image can be verified when starting the virtual machine image. Thus, the virtual machine image can be started responsive to verifying its integrity, thereby ensuring that the virtual machine image has not been altered from its expected configuration. In particular, when the virtual machine image is migrated from one physical hardware platform to another or restarted from a suspended state, the virtual machine image can be verified, thereby ensuring that the virtual machine image has not been mis-configured before, during, or after a transfer or migration. Therefore, any doubt about the state of the virtual machine image can be removed.

When the virtual machine image is stopped at state 520, the virtual machine image is unloaded from execution and memory. The integrity of the virtual machine image can be verified when stopping the virtual machine image to determine whether it is still has a trustworthy configuration. Thus, the virtual machine image can be stopped responsive to verifying its integrity, thereby ensuring that the virtual machine image has not been altered from its expected configuration. If it is determined that the virtual machine image is not trustworthy, the virtual machine image can be flagged, which can provide an indication of its untrustworthiness when the virtual machine image is later restarted. A digest of the stopped virtual machine can also be recorded, for later use in verifying the virtual machine (e.g., when the virtual machine is restarted).

When the virtual machine image is suspended at state 525, as might happen in advance of a migration, for example, the integrity of the virtual machine image can be verified prior to leaving the physical hardware platform, thereby creating a verifiable audit record of execution and movement. The suspended virtual machine image can be analyzed to determine whether it is still has a trustworthy configuration. The virtual machine image can be suspended responsive to verifying its integrity, or suspended before verifying its integrity. In the case where the virtual machine image is suspended in order to perform a migration, the virtual machine image can be taken out of use or the migration aborted if the virtual machine image is determined to be untrustworthy.

When the virtual machine image is migrated at state 530, the contents of the virtual machine image are moved from one physical hardware platform to another. Depending on the implementation of the migration function of the VMM, verification of the virtual machine image may or may not be desirable. For example, the migrate state 530 can comprise suspend, move, and start operations. In some embodiments of the present invention, the integrity verification component 105 is configured to analyze the virtual machine image when migrating the virtual machine image from one physical hardware platform to another. In some embodiments of the present invention, when the virtual machine image is migrated, the virtual machine image is stopped or suspended on one physical hardware platform, and started on a different physical hardware platform, each of which can include a verification of the integrity of the virtual machine image.

When the virtual machine image is destroyed at state 535, the contents and any existing state information can be erased from both execution and storage. As is the case in highly regulated industries, such as financial services, healthcare, human services, government, and telecommunications, among other possibilities, it can be important to capture the integrity state of the virtual machine image at the time of destruction and create an auditable record of its existence or non-existence as it relates to time. Since the virtual machine image is destroyed, and the virtual machine image lifecycles can vary widely, the creation of an integrity record at the time of destruction can be a valuable record of the state of existence of the virtual machine image during the end of its lifecycle. Thus, the virtual machine image can be destroyed responsive to verifying the integrity of the virtual machine image.

Integration of integrity verification services as described above provides support for higher level commands for controlling the integrity lifecycle of a virtual machine image. Such commands can be issued from the VMM 110 (of FIG. 1) or other management interface. Such commands can include: Create_Trusted_VM, Start_Trusted_VM, Migrate_Trusted_VM, Stop_Trusted_VM, Suspend_Trusted_VM, or Destroy_Trusted_VM, among other possibilities.

Figure 6:
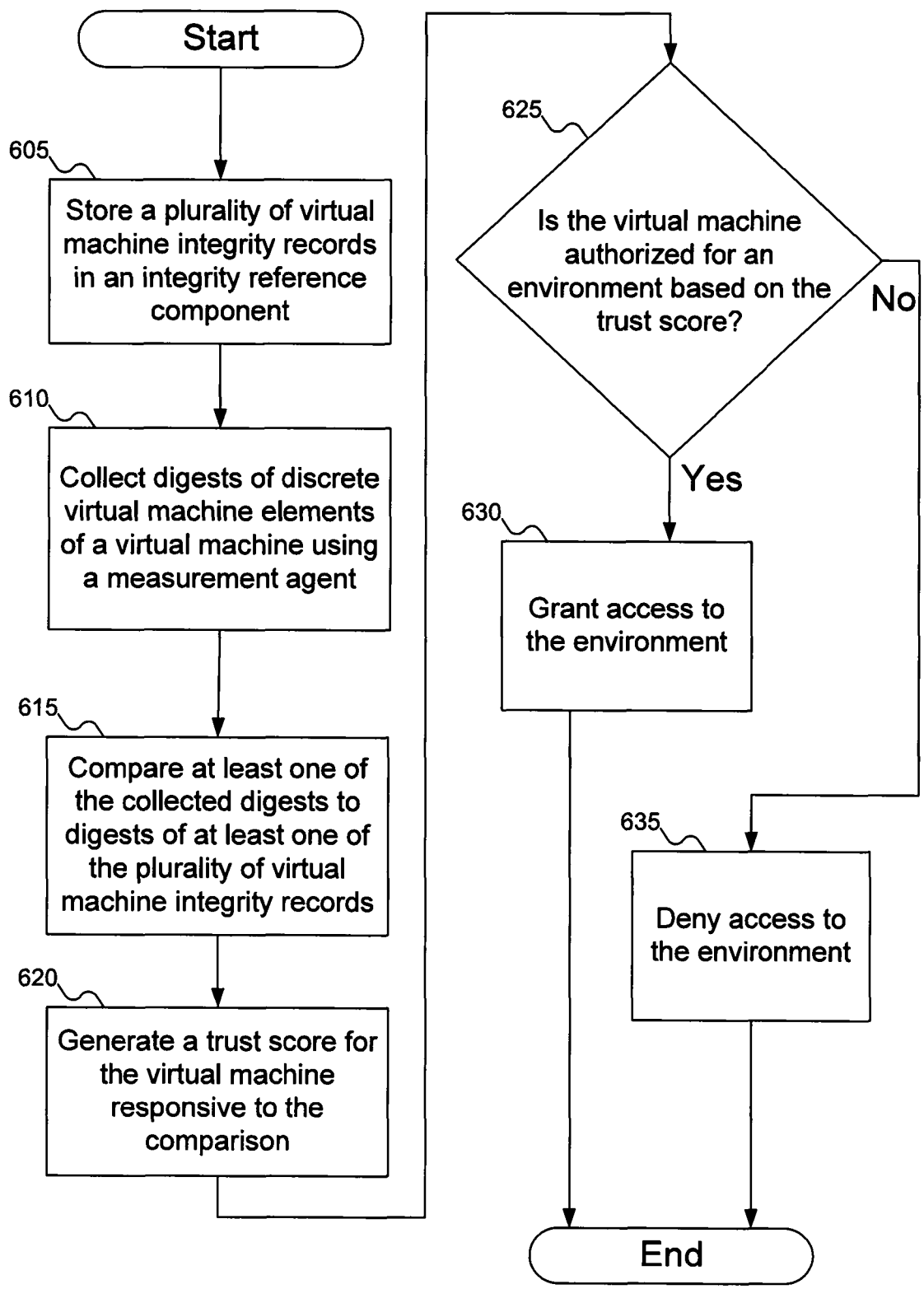
FIG. 6 shows a flow diagram including a method for verifying the integrity of discrete virtual machine elements of a virtual machine image according to some embodiments of the present invention.

FIG. 6 shows a flow diagram including a method for verifying the integrity of discrete virtual machine elements of a virtual machine image according to some embodiments of the present invention. At 605, the virtual machine integrity records (130 of FIG. 4) can be stored in an integrity reference component (125 of FIG. 4). The virtual machine integrity records can include known good digests (135 of FIG. 4) of previously collected and previously verified virtual machine images and discrete virtual machine image elements. At 610, measurements (410 of FIG. 4) can be collected including digests of discrete virtual machine image elements (415 of FIG. 4) that have been deployed for general use. Measurement agents (405 of FIG. 4), which can be configured within each of the virtual machine images (120 of FIG. 4), can be used to collect the measurements (410 of FIG. 4). The collected measurements (410 of FIG. 4) can include digests of at least one of the discrete virtual machine image elements (415 of FIG. 4). The measurement agents (405 of FIG. 4) can generate the digests of the discrete virtual machine image elements (415 of FIG. 4). Alternatively, the integrity verification component (105 of FIG. 4) can generate the digests based on the collected measurements (410 of FIG. 4).

At 615, the digests of the discrete virtual machine image elements (415 of FIG. 4) stored in at least one of the virtual machine images (120 of FIG. 4) can be compared to digests stored in at least one of the virtual machine integrity records (130 of FIG. 4) stored in the integrity reference component (125 of FIG. 4). At 620, the integrity verification component (105 of FIG. 4) can generate a trust score for one or more of the virtual machine images (120 of FIG. 4) responsive to comparing the digests of one or more discrete virtual machine image elements (415 of FIG. 4) to digests (135 of FIG. 4) of at least one of the virtual machine integrity records (130 of FIG. 4).

A determination can be made at 625 as to whether one or more of the virtual machine images (120 of FIG. 4) is authorized for an environment based on the trust score generated at 620. The environment can be a virtualized environment. If it is determined that a given virtual machine image (120 of FIG. 4) is authorized for the environment, then access to the environment can be granted to the virtual machine image responsive to the determination at 630. Conversely, if it is determined that the given virtual machine image (120 of FIG. 4) is not authorized for the environment, then access to the environment can be denied to the virtual machine image (120 of FIG. 4) responsive to the determination at 635.

As previously discussed above, generating the trust score for the virtual machine images (120 of FIG. 4) can include using an authenticity score authenticating a source of the collected measurements (410 of FIG. 4). The discrete virtual machine image elements (415 of FIG. 4) can include an operating system file, an application file, or a configuration file, among other possibilities. The operation 610 of collecting measurements (410 of FIG. 4) can include generating digests of the operating system file, the application file, or the configuration file, among other possibilities. The collected measurements (410 of FIG. 4) can be transferred between the measurement agents (405 of FIG. 4) and the integrity verification component (105 of FIG. 4), and then compared to at least one of the virtual machine integrity records (130 of FIG. 4) of the integrity reference component (125 of FIG. 4). The integrity reference component (125 of FIG. 4) can be remotely accessed over a network.

Figure 7:
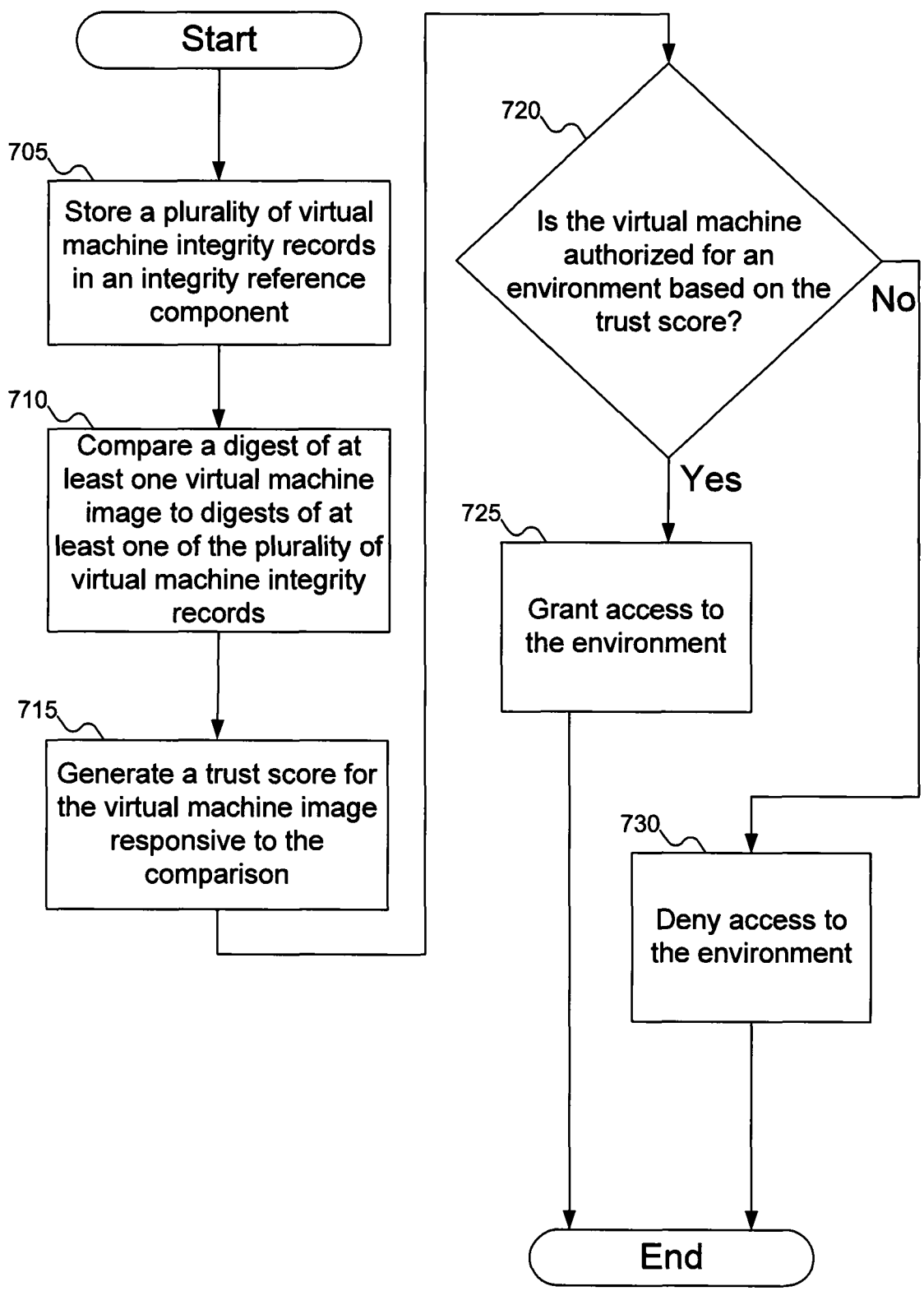
FIG. 7 shows a flow diagram including a method for verifying the integrity of virtual machine images according to some embodiments of the present invention.

FIG. 7 shows a flow diagram including a method for verifying the integrity of virtual machine images according to some embodiments of the present invention. At 705, the virtual machine integrity records (130 of FIG. 1) can be stored in an integrity reference component (125 of FIG. 1). The virtual machine integrity records can include known good digests (135 of FIG. 1) of previously collected and previously verified virtual machine images and discrete virtual machine image elements. Measurements (410 of FIG. 4) can be collected including digests of at least one virtual machine image (120 of FIG. 1) that have been deployed for general use. The integrity verification component (105 of FIG. 1) can generate the digests based on the collected measurements (410 of FIG. 4). Alternatively, the measurement agents (405 of FIG. 4) can generate the digests of the virtual machine images (120 of FIG. 1)

At 710, the digests of the virtual machine images (120 of FIG. 1) can be compared to digests stored in at least one of the virtual machine integrity records (130 of FIG. 1) stored in the integrity reference component (125 of FIG. 1). At 715, the integrity verification component (I 05 of FIG. 1) can generate a trust score for one or more of the virtual machine images (120 of FIG. 1) responsive to comparing the digests of one or more virtual machine images (120 of FIG. 1) to digests (135 of FIG. 1) of at least one of the virtual machine integrity records (130 of FIG. 1). The trust score can also be generated based on both a comparison of the digests of the virtual machine images (120 of FIG. 1) to digests (135 of FIG. 1) of at least one of the virtual machine integrity records (130 of FIG. 1), and on a comparison of the digests of the discrete virtual machine image elements (415 of FIG. 4) to digests (135 of FIG. 4) of at least one of the virtual machine integrity records (130 of FIG. 4).

A determination can be made at 720 as to whether one or more of the virtual machine images (120 of FIG. 4) is authorized for an environment based on the trust score generated at 715. The environment can be a virtualized environment. If it is determined that a given virtual machine image (120 of FIG. 1) is authorized for the environment, then access to the environment can be granted to the virtual machine image responsive to the determination at 725. Conversely, if it is determined that the given virtual machine image (120 of FIG. 1) is not authorized for the environment, then access to the environment can be denied to the virtual machine image (120 of FIG. 1) responsive to the determination at 730.

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
   a machine;
   a virtual machine manager capable of managing one or more virtual machine images installed on the machine;
   an integrity reference component configured to store a plurality of virtual machine integrity records; and
   an integrity verification component communicatively coupled to the virtual machine manager and the integrity reference component, the integrity verification component configured to compare a digest of said one or more virtual machine images to a digest of at least one of said plurality of virtual machine integrity records accessible from the integrity reference component,
   wherein the integrity verification component is further configured to generate a trust score, among a plurality of trust scores, for one or more of the virtual machine images responsive to the comparison; and
   wherein the system is configured to grant access to an environment responsive to determining whether the one or more virtual machine images are authorized for the environment based on the trust score.

2. The system of claim 1, wherein:
   said one or more virtual machine images includes a plurality of discrete virtual machine image elements; and
   the integrity verification component is configured to compare digests of said plurality of discrete virtual machine image elements to digests of at least one of said plurality of virtual machine integrity records accessible from the integrity reference component.

3. The system of claim 2, further comprising a measurement agent operable within each of said one or more virtual machine images and configured to collect measurements of said discrete virtual machine image elements corresponding to said one or more virtual machine images.

4. The system of claim 3, wherein:
   said collected measurements include said digests of said discrete virtual machine image elements.

5. The system of claim 3, wherein:
   said discrete virtual machine image elements include at least one of an operating system file, an application file, or a configuration file;
   said collected measurements include digests of at least one of said operating system file, said application file, or said configuration file of said one or more virtual machine images; and
   said collected measurements include at least one of version information of said discrete virtual machine image elements, vendor information of said discrete virtual machine image elements, or location information of said discrete virtual machine image elements.

6. The system of claim 3, wherein:
   the measurement agent operable within each of said one or more virtual machine images is configured to transfer said collected measurements to the integrity verification component; and
   the integrity verification component is configured to compare said collected measurements to at least one of said virtual machine integrity records of the integrity reference component.

7. The system of claim 3, wherein the integrity verification component is configured to generate the trust score using an authenticity score authenticating a source of said collected measurements.

8. The system of claim 2, wherein the integrity verification component is configured to generate a trust score for at least one of said discrete virtual machine image elements responsive to said comparison.

9. The system of claim 8, wherein the integrity verification component is configured to generate the trust score for the at least one of said discrete virtual machine images using an authenticity score authenticating a source of said collected measurements.

10. The system of claim 2, wherein the integrity verification component is configured to generate said digests of said discrete virtual machine image elements.

11. The system of claim 1, wherein the integrity verification component is integrated with the virtual machine manager.

12. The system of claim 1, wherein the integrity verification component includes a sub-process having security privileges at least as high as security privileges for the virtual machine manager.

13. The system of claim 1, wherein the integrity verification component is integrated with a physical hardware layer of the machine.

14. The system of claim 1, wherein the integrity verification component is configured to verify the integrity of a software stack used to create said one or more virtual machine images prior to creation of said one or more virtual machine images.

15. The system of claim 1, wherein the integrity verification component is configured to verity the integrity of said one or more virtual machine images when starting said one or more virtual machine images.

16. The system of claim 1, wherein the integrity verification component is configured to analyze said one or more virtual machine images when stopping said one or more virtual machine images.

17. The system of claim 1, wherein the integrity verification component is configured to analyze said one or more virtual machine images when suspending said one or more virtual machine images.

18. The system of claim 1, wherein the integrity verification component is configured to analyze said one or more virtual machine images when migrating said one or more virtual machine images from a second machine to the machine.

19. The system of claim 18, wherein:
   the integrity verification component is configured to analyze said one or more virtual machine images when stopping said one or more virtual images on said second machine; and
   the integrity verification component is configured to analyze said one or more virtual machine images when starting said one or more virtual images on the machine.

20. The system of claim 1, wherein the integrity verification component is configured to analyze said one or more virtual machine images when destroying said one or more virtual machine images.

21. The system of claim 1, wherein the integrity reference component is remotely accessible over a network.

22. The system of claim 1, wherein the integrity reference component includes a virtual machine image.

23. The system of claim 1, wherein the integrity reference component is digitally signed by an integrity reference provider.

24. A computer-implemented method for verifying the integrity of virtual machines, comprising:
    storing a plurality of virtual machine integrity records in an integrity reference component;
    comparing a digest of one or more virtual machine images to a digest of at least one of the plurality of virtual machine integrity records stored in the integrity reference component;
    generating a trust score, among a plurality of trust scores, for the one or more virtual machine images responsive to comparing the digest of the one or more virtual machine images to the digest of the at least one of the plurality of virtual machine integrity records;
    determining whether the one or more virtual machine images is authorized for an environment based on the trust score; and
    granting access to the environment responsive to the determination.

25. A computer-implemented method according to claim 24, wherein generating the trust score for the one or more virtual machine images includes using an authenticity score authenticating a source of the collected measurements.

26. A computer-implemented method according to claim 24, further comprising comparing digests of discrete virtual machine image elements in one of the virtual machine images to digests stored in at least one of the plurality of virtual machine integrity records stored in the integrity reference component.

27. A computer-implemented method according to claim 26, further comprising:
    collecting measurements of the discrete virtual machine image elements using a measurement agent configured within each of the one or more virtual machine images.

28. A computer-implemented method according to claim 27, wherein collecting measurements includes generating a digest of at least one of the discrete virtual machine image elements.

29. A computer-implemented method according to claim 27, wherein:
    the discrete virtual machine image elements include at least one of an operating system file, an application file, or a configuration file;
    collecting measurements includes:
    generating digests of at least one of the operating system file, the application file, or the configuration file of the one or more virtual machine images; and
    collecting at least one of version information of said discrete virtual machine image elements, vendor information of said discrete virtual machine image elements, or location information of said discrete virtual machine image elements.

30. A computer-implemented method according to claim 27, further comprising:
    transferring the collected measurements between the measurement agent configured within each of the one or more virtual machine images and the integrity verification component; and
    comparing the collected measurements to at least one of the plurality of virtual machine integrity records of the integrity reference component.

31. A computer-implemented method according to claim 30, further comprising:
    generating a trust score for at least one of the discrete virtual machine image elements responsive to the comparison.

32. A computer-implemented method according to claim 31, wherein generating the trust score includes using an authenticity score authenticating a source of the collected measurements.

33. A computer-implemented method according to claim 24, further comprising:
    verifying the integrity of a software stack used to create the one or more virtual machine images prior to creation of the one or more virtual machine images; and
    creating the one or more virtual machine images responsive to verifying the integrity of the software stack.

34. A computer-implemented method according to claim 24, further comprising:
    starting the one or more virtual machine images responsive to verifying the integrity of the one or more virtual machine images.

35. A computer-implemented method according to claim 24, further comprising:
    stopping the one or more virtual machine images responsive to verifying the integrity of the one or more virtual machine images.

36. A computer-implemented method according to claim 24, further comprising:
    suspending the one or more virtual machine images responsive to verifying the integrity of the one or more virtual machine images.

37. A computer-implemented method according to claim 24, further comprising:
    migrating the one or more virtual machine images responsive to verifying the integrity of the one or more virtual machine images.

38. A computer-implemented method according to claim 24, further comprising:
    verifying the integrity of the one or more virtual machine images when destroying the one or more virtual machine images; and
    destroying the one or more virtual machine images responsive to verifying the integrity of the one or more virtual machine images.

39. A computer-implemented method according to claim 24, further comprising:
    remotely accessing the integrity reference component over a network.

40. An article comprising a non-transitory machine-accessible medium having associated data that, when accessed, results in a machine:
    storing a plurality of virtual machine integrity records in an integrity reference component;
    comparing a digest of one or more virtual machine images to a digest of at least one of the plurality of virtual machine integrity records stored in the integrity reference component;
    generating a trust score, among a plurality of trust scores, for the one or more virtual machine images responsive to comparing the digest of the one or more virtual machine images to the digest of the least one of the plurality of virtual machine integrity records;

determining whether the one or more virtual machine images is authorized for an environment based on the trust score; and granting access to the environment responsive to the determination.

41. An article according to claim 40, wherein generating the trust score for the one or more virtual machine images includes using an authenticity score authenticating a source of the collected measurements.

42. An article according to claim 40, further comprising comparing digests of discrete virtual machine image elements in one of the virtual machine images to digests stored in at least one of the plurality of virtual machine integrity records stored in the integrity reference component.

43. An article according to claim 42, further comprising:
collecting measurements of the discrete virtual machine image elements using a measurement agent configured within each of the one or more virtual machine images.

44. An article according to claim 43, wherein collecting measurements includes generating a digest of at least one of the discrete virtual machine image elements.

45. An article according to claim 43, wherein:
the discrete virtual machine image elements include at least one of an operating system file, an application file, or a configuration file; and
collecting measurements includes generating digests of at least one of the operating system file, the application file, or the configuration file of the one or more virtual machine images.

46. An article according to claim 43, further comprising:
transferring the collected measurements between the measurement agent configured within each of the one or more virtual machine images and an integrity verification component; and
comparing the collected measurements to at least one of the plurality of virtual machine integrity records of the integrity reference component.

47. An article according to claim 46, further comprising:
generating a trust score for at least one of the discrete virtual machine image elements responsive to said comparing the collected measurements.

48. An article according to claim 47, wherein generating the trust score includes using an authenticity score authenticating a source of the collected measurements.

49. An article according to claim 40, further comprising:
verifying the integrity of a software stack used to create the one or more virtual machine images prior to creation of the one or more virtual machine images; and
creating the one or more virtual machine images responsive to verifying the integrity of the software stack.

50. An article according to claim 40, further comprising:
starting the one or more virtual machine images responsive to verifying the integrity of the one or more virtual machine images.

51. An article according to claim 40, further comprising:
stopping the one or more virtual machine images responsive to verifying the integrity of the one or more virtual machine images.

52. An article according to claim 40, further comprising:
suspending the one or more virtual machine images responsive to verifying the integrity of the one or more virtual machine images.

53. An article according to claim 40, further comprising:
migrating the one or more virtual machine images responsive to verifying the integrity of the one or more virtual machine images.

54. An article according to claim 40, further comprising:
verifying the integrity of the one or more virtual machine images when destroying the one or more virtual machine images; and
destroying the one or more virtual machine images responsive to verifying the integrity of the one or more virtual machine images.

55. An article according to claim 40, further comprising:
remotely accessing the integrity reference component over a network.

* * * * *